Patented Apr. 10, 1934

1,954,219

UNITED STATES PATENT OFFICE 1,954,219

PRESERVATION OF RUBBER CEMENT COATED ARTICLES

Harry E. Moyses, New York, N. Y.

No Drawing. Application March 31, 1930, Serial No. 440,639

2 Claims. (Cl. 91—68)

This invention relates to rubber cement coated articles, such as tire repair patches or material on which a facing of rubber cement is applied for attaching the patch or material to the tires being repaired. This cemented face must be preserved in tacky condition.

Heretofore, such materials have been supplied with an expensive protective layer of Holland cloth, cellophane, etc. applied over the cement facing which is stripped from the patch prior to attaching the patch to a tire.

The general purpose of the present invention is to provide a rubber cement coated article or material with a protective coating which can be painted onto the material by dipping, spraying, brushing, spreading, etc. and which can be easily removed when the article is to be used.

It has been found that liquid derivatives of cellulose, such as cellulose acetate, with any suitable fillers or compounding ingredients will provide an effective preservative coating which will dry quickly and can be crumbled, stripped, peeled or flaked off the articles when they are to be used. The materials provide an air-tight coating so that the articles are not affected by age.

Other cellulose derivatives, such as viscose, and other similar materials may be employed for the purpose, cellulose derivatives being preferred, however, because of their superior qualities for this purpose since they have no tendency to be absorbed in the rubber cement coating and they are easily removed therefrom when crumpled.

Modifications of the invention may be resorted to without departing from the spirit thereof or the scope of the appended claims.

What is claimed is:

1. An article of manufacture having a tacky rubber cement coated face and a continuous, airtight, protective covering of cellulose acetate applied over said face as a liquid and adapted easily to separate therefrom when dry.

2. An article of manufacture having a tacky rubber cement coated face and a continuous, airtight, protective covering comprising a cellulose derivative applied over said face as a liquid and adapted easily to separate therefrom when dry.

HARRY E. MOYSES.